(12) United States Patent
Liu (10) Patent No.: US 12,114,262 B2
(45) Date of Patent: Oct. 8, 2024

(54) WAKE-UP METHOD, WAKE-UP APPARATUS, ELECTRONIC DEVICE AND COMPUTER-READABLE STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 645 days.

(21) Appl. No.: 17/267,689

(22) PCT Filed: Aug. 13, 2018

(86) PCT No.: PCT/CN2018/100303
§ 371 (c)(1),
(2) Date: Feb. 10, 2021

(87) PCT Pub. No.: WO2020/034074
PCT Pub. Date: Feb. 20, 2020

(65) Prior Publication Data
US 2021/0160779 A1  May 27, 2021

(51) Int. Cl.
*H04W 52/02* (2009.01)
*H04W 72/04* (2023.01)
*H04W 72/23* (2023.01)
*H04B 7/06* (2006.01)

(52) U.S. Cl.
CPC ....... *H04W 52/0229* (2013.01); *H04W 72/23* (2023.01); *H04B 7/0626* (2013.01)

(58) Field of Classification Search
CPC ......... H04W 52/0216; H04W 52/0229; H04W 52/028; H04W 72/23; H04B 7/0626; H04B 7/0695
See application file for complete search history.

(56) References Cited

U.S. PATENT DOCUMENTS

| 8,885,532 B2 | 11/2014 | Wang et al. |
| 9,668,237 B2 | 5/2017 | Huschke et al. |
| 2007/0271384 A1 | 11/2007 | Zmudzinski et al. |

(Continued)

FOREIGN PATENT DOCUMENTS

| CN | 105340334 A | 2/2016 |
| CN | 106063338 A | 10/2016 |

(Continued)

OTHER PUBLICATIONS

State Intellectual Property Office of the People's Republic of China, Office Action and Search Report Issued in Application No. 201880001755.X, Apr. 24, 2020, 20 pages.

(Continued)

*Primary Examiner* — Liton Miah
(74) *Attorney, Agent, or Firm* — Finnegan, Henderson, Farabow, Garrett & Dunner, L.L.P.

(57) ABSTRACT

An example of the present disclosure provides a wakeup method, including: determining user equipment (UE) to be waked up; and sending indication information to the user equipment, wherein the indication information is used to indicate a beam and a time domain resource and/or a frequency domain resource for receiving a wakeup signal block by the UE.

12 Claims, 5 Drawing Sheets

(56) References Cited

U.S. PATENT DOCUMENTS

| | | | |
|---|---|---|---|
| 2018/0199359 | A1 | 7/2018 | Cao et al. |
| 2018/0206132 | A1 | 7/2018 | Guo et al. |
| 2019/0053321 | A1* | 2/2019 | Islam .................. H04W 72/542 |
| 2020/0029238 | A1 | 1/2020 | Si et al. |
| 2020/0029302 | A1* | 1/2020 | Cox .................. H04W 52/0216 |
| 2021/0153120 | A1* | 5/2021 | Atungsiri ............ H04L 27/2636 |

FOREIGN PATENT DOCUMENTS

| | | |
|---|---|---|
| CN | 107735975 A | 2/2018 |
| CN | 107820721 A | 3/2018 |
| CN | 108282847 A | 7/2018 |
| CN | 108347757 A | 7/2018 |
| CN | 110831124 A | 2/2020 |
| WO | WO 2014/053084 A1 | 4/2014 |
| WO | WO 2018/128595 A1 | 7/2018 |

OTHER PUBLICATIONS

ISA State Intellectual Property Office of the People's Republic of China, International Search Report Issued in Application No. PCT/CN2018/100303, May 5, 2019, WIPO, 4 pages.

Qualcomm Incorporated, "Wake-Up Signaling for C-DRX", 3GPP TSG RAN WG2 NR #99, Berlin, Germany, R2-1709115, Aug. 21-25, 2017, 5 pages.

Qualcomm, "Wakeup Signaling for multi-beam systems", 3GPP TSG-RAN WG2 Meeting RAN2 #99bis, Prague, Czech, R2-1711703, Resubmission of R2-1709116, Oct. 9-13, 2017, 4 pages.

CATT, "UE Power Saving and Wakeup Mechanism", 3GPP TSG RAN Meeting #78, Lisbon, Portugo, RP-172373, Dec. 18-21, 2017, 14 pages.

CATT, CMCC, vivo, CATR, Qualcomm, "New SID: Study on UE Power Saving and Wakeup Mechanism in NR", 3GPP TSG RAN Meeting #78, Lisbon, Portugal, RP-172718 (rev of RP-172372), Dec. 18-21, 2017, 5 pages.

CATT, "Views on the Scope of the Study of UE Power Saving and Wakeup Mechanism", 3GPP TSG-RAN #79, Chennai, India, RP-180228, Mar. 19-22, 2018, 2 pages.

Extended European Search Report in European Application No. 18930374.6, mailed on Feb. 28, 2022.

Examination Report for Indian Application No. 202147010079, issued on Feb. 3, 2022.

Written Opinion of the International Searching Authority in Application No. PCT/CN2018/100303, mailed on May 5, 2019, 10 pages.

Qualcomm Incorporated, "Maintenance for CSI Measurement", 3GPP TSG RAN WG1 Meeting #93, R1-1807339, May 21-25, 2018 Busan, Korea, 9 pages.

* cited by examiner

WAKE-UP METHOD, WAKE-UP APPARATUS, ELECTRONIC DEVICE AND COMPUTER-READABLE STORAGE MEDIUM

CROSS REFERENCE TO RELATED APPLICATIONS

This application is a national phase application based on International Application No. PCT/CN2018/100303, filed Aug. 13, 2018, the content of which is incorporated herein by reference.

TECHNICAL FIELD

The present disclosure relates to the field of communication technology, and in particular to wakeup methods, wakeup apparatuses, electronic devices and computer readable storage media.

BACKGROUND

In order to reduce power consumption of user equipment (UE), wakeup signal (WUS for short) is introduced in the related art. A base station may help to reduce the power consumption of the UE in a connected state or an idle state to some extent by sending wakeup signals to the UE.

However, current manners of determining a timing when the wakeup signal is received by the UE is less applicable, for example, it is not applicable to New Radio (NR) based businesses.

SUMMARY

In view of this, an example of the present disclosure provides a wakeup method, a wakeup apparatus, an electronic device and a computer readable storage medium.

According to a first aspect of the example of the present disclosure, there is provided a wakeup method applied to a base station, including:

determining user equipment (UE) to be waked up;

sending indication information to the UE, wherein the indication information is used to indicate a beam and a time domain resource and/or a frequency domain resource for receiving a wakeup signal block by the UE.

Optionally, if the UE is in an idle state, the indication information is system information.

Optionally, the system information is sent to the UE by broadcasting.

Optionally, the system information is sent to the UE on demand.

Optionally, the indication information indicates the beam for receiving the wakeup signal block by the UE through an index of a synchronization signal block.

Optionally, if the UE is in a connected state, the indication information is radio resource control message.

Optionally, the indication information indicates the beam for receiving the wakeup signal block by the UE through at least one of: an index of a synchronization signal block; or a channel state information reference signal.

Optionally, the indication information is further used to indicate a structure of the wakeup signal block.

Optionally, the structure of the wakeup signal block includes one of:

a wakeup signal; a physical channel; and a wakeup signal and a physical channel.

Optionally, the indication information is further used to indicate a state of the beam when the UE is receiving the wakeup signal block.

According to a second aspect of the example of the present disclosure, there is provided a wakeup method applied to user equipment (UE), including:

receiving indication information sent from a base station;

determining a beam and a time domain resource and/or a frequency domain resource for receiving a wakeup signal block according to the indication information.

Optionally, if the UE is in an idle state, the indication information is system information.

Optionally, receiving the indication information sent from the base station includes:

receiving the system information by monitoring.

Optionally, receiving the indication information sent from the base station includes:

receiving the system information on demand.

Optionally, the indication information indicates the beam for receiving the wakeup signal block by the UE through an index of a synchronization signal block.

Optionally, if the UE is in a connected state, the indication information is a radio resource control message.

Optionally, the indication information indicates the beam for receiving the wakeup signal block by the UE through at least one of: an index of a synchronization signal block; or a channel state information reference signal.

Optionally, the wakeup method further includes:

determining a structure of the wakeup signal block according to the indication information.

Optionally, the structure of the wakeup signal block includes one of:

a wakeup signal; a physical channel; and a wakeup signal and a physical channel.

Optionally, the wakeup method further includes:

determining a state of the beam when the UE is receiving the wakeup signal block according to the indication information.

According to a third aspect of the example of the present disclosure, there is provided a wakeup apparatus applied to a base station, including:

a user determining module, configured to determine user equipment (UE) to be waked up;

an indication sending module, configured to send indication information to the UE, wherein the indication information is used to indicate a beam and a time domain resource and/or a frequency domain resource for receiving a wakeup signal block by the UE.

Optionally, if the UE is in an idle state, the indication information is system information.

Optionally, the system information is sent to the UE by broadcasting.

Optionally, the system information is sent to the UE on demand.

Optionally, the indication information indicates the beam for receiving the wakeup signal block by the UE through an index of a synchronization signal block.

Optionally, if the UE is in a connected state, the indication information is a radio resource control message.

Optionally, the indication information indicates the beam for receiving the wakeup signal block by the UE through at least one of: an index of a synchronization signal block; or a channel state information reference signal.

Optionally, the indication information is further used to indicate a structure of the wakeup signal block.

Optionally, the structure of the wakeup signal block includes one of:

a wakeup signal; a physical channel; and a wakeup signal and a physical channel.

Optionally, the indication information is further used to indicate a state of the beam when the UE is receiving the wakeup signal block.

According to a fourth aspect of the example of the present disclosure, there is provided a wakeup apparatus applied to user equipment (UE), including:

an indication receiving module, configured to receive indication information sent from a base station;

a wakeup determining module, configured to determine a beam and a time domain resource and/or a frequency domain resource for receiving a wakeup signal block according to the indication information.

Optionally, if the UE is in an idle state, the indication information is system information.

Optionally, the indication receiving module is configured to receive the system information by monitoring.

Optionally, the indication receiving module is configured to receive the system information on demand.

Optionally, the indication information indicates the beam receiving the wakeup signal block by the UE through an index of a synchronization signal block.

Optionally, if the UE is in a connected state, the indication information is a radio resource control message.

Optionally, the indication information indicates the beam for receiving the wakeup signal block by the UE through at least one of: an index of a synchronization signal block; or a channel state information reference signal.

Optionally, the wakeup apparatus further includes:

a structure determining module, configured to determine a structure of the wakeup signal block according to the indication information.

Optionally, the structure of the wakeup signal block includes one of:

a wakeup signal; a physical channel; and a wakeup signal and a physical channel.

Optionally, the wakeup apparatus further includes:

a state determining module, configured to determine a state of the beam when the UE is receiving the wakeup signal block according to the indication information.

According to a fifth aspect of the present disclosure, there is provided an electronic device, including:

a processor;

a memory storing instructions executable by the processor.

The processor is configured to perform steps in the method according to any one above example.

According to a sixth aspect of the present disclosure, there is provided a computer readable storage medium storing computer programs which are executed by the processor to perform steps in the method according to any one above example.

According to an example, on one hand, the indication information may indicate a time domain resource and/or a frequency domain resource for receiving a wakeup signal block by the UE. On the basis of indicating a beam, it is possible to indicate only the time domain resources, or only the frequency domain resources, or both the time domain resources and the frequency domain resources. This enables the base station to flexibly configure the time domain resource and/or the frequency domain resource for receiving the wakeup signal block by the UE. In this way, the base station can specify appropriate time domain resource and/or frequency domain resource for receiving the wakeup signal block by the UE according to business needs.

On the other hand, the indication information can also indicate a beam for receiving a wakeup signal block by UE. In NR technologies, since a signal needs to be sent and received over a beam, if the beam for receiving the wakeup signal block is not indicated to the UE, the UE may expect to receive a wakeup signal block over a beam that has not sent a wakeup signal block, and thus leading to failure of receiving a wakeup signal block or failure of parsing the wakeup signal block accurately due to weak signal strength of the received wakeup signal block. Therefore, by indicating to the UE the beam for receiving the wakeup signal block, the UE can receive the wakeup signal over the indicated beam and it is ensured that the UE receives the wakeup signal block well.

BRIEF DESCRIPTION OF THE DRAWINGS

To describe the technical solutions in the examples of the present disclosure more clearly, drawings required in descriptions of the examples of the present disclosure will be briefly introduced below. It is apparent that the drawings described below are merely examples of the present disclosure and other drawings may be obtained by those of ordinary skill in the prior art based on these drawings without paying creative work.

DETAILED DESCRIPTION OF THE EMBODIMENTS

The technical solutions of embodiments of the present disclosure will be described clearly and fully below in combination with drawings in the embodiments of the present disclosure. It is apparent that the described embodiments are merely part of embodiments of the present disclosure rather than all embodiments. Other embodiments achieved by those of ordinary skill in the art based on the embodiments in the present disclosure without paying creative work shall all fall into the scope of protection of the present disclosure.

Figure 1:
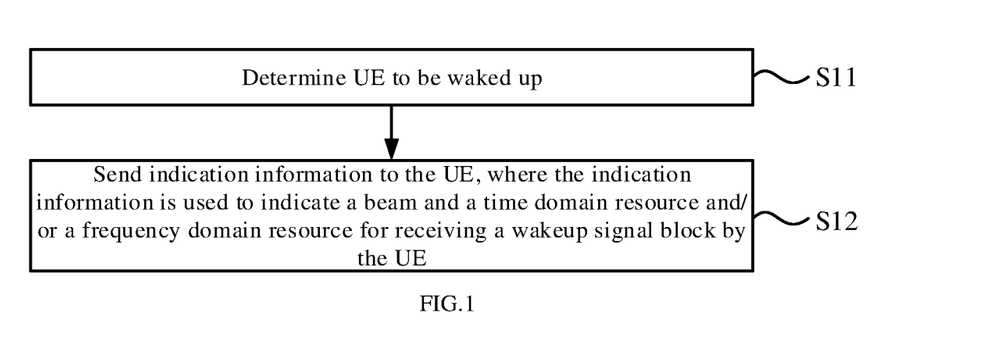
FIG. 1 is a flowchart of a wakeup method according to an example of the present disclosure.

FIG. 1 is a flowchart of a wakeup method according to an example of the present disclosure. The wakeup method in this example may be applied to a base station. The base station may communicate with user equipment (UE), for example, based on NR or based on Long Term Evolution (LTE). The UE may be a mobile phone, a tablet computer, a wearable device and so on.

As shown in FIG. 1, the wakeup method may include the following steps.

At step S11, UE to be waked up is determined;

At step S12, indication information is sent to the UE, where the indication information is used to indicate a beam and a time domain resource and/or a frequency domain resource for receiving a wakeup signal block by the UE.

In an example, the UE to be waked up may be UE in a connected state or in an idle state. The wakeup signal may have different wakeup effects on the UE in a different state.

For example, the wakeup signal may be used to indicate a timing when UE in an idle state receives a paging signaling. Thus, the UE may monitor what a base station broadcasts after the timing has been determined, for example, at the closest timing for receiving a paging signaling after receiving of the wakeup signal. In such way, a paging signaling may be received through monitoring only once. The wakeup signal may be in the form of a sequence, and it costs less power consumption for the UE to monitor and parse the sequence rather than the paging signaling. As a result, compared to the case of monitoring and parsing the paging signaling to receive the paging signaling, the UE may determine the timing for receiving the paging signaling by monitoring and parsing the wakeup signal and further receive the paging signaling at the determined timing, which reduces the power consumption of the UE.

For example, the wakeup signal may indicate an aggregation level for the UE in a connected state to demodulate information transmitted over a physical downlink control channel (PDCCH). Then, after determining the aggregation level, the UE can demodulate the information transmitted over the PDCCH according to the determined aggregation level. In this way, it may be avoided that the UE demodulates the information transmitted over the PDCCH several times with several aggregation levels due to not knowing a specific aggregation level, thereby reducing the power consumption of the UE.

In related art, take UE in an idle state as an example, the UE makes an agreement with a base station in a way that the time to receive wakeup signal is prior to the timing to receive a paging signaling by a preset time length. This manner of receiving a wakeup signal makes that, in the process of communicating with the base station, the UE can only receive the wakeup signal at a fixed timing according to the agreement, which is very inflexible.

In an example, a wakeup signal block may include a wakeup signal, and may further include content other than the wakeup signal. Details of the content will be explained in subsequent examples. The wakeup signal block can at least function as the wakeup signal to reduce power consumption of the UE.

According to an example, on one hand, the indication information may indicate a time domain resource and/or a frequency domain resource for receiving a wakeup signal block by the UE. On the basis of indicating a beam, it is possible to indicate only the time domain resources, or only the frequency domain resources, or both the time domain resources and the frequency domain resources. This enables the base station to flexibly configure the time domain resource and/or the frequency domain resource for receiving the wakeup signal block by the UE. In this way, the base station can specify appropriate time domain resource and/or frequency domain resource for receiving the wakeup signal block by the UE according to business needs.

On the other hand, the indication information can also indicate a beam for receiving a wakeup signal block by UE. In NR technologies, since a signal needs to be sent and received over a beam, if the beam for receiving the wakeup signal block is not indicated to the UE, the UE may expect to receive a wakeup signal block over a beam that has not sent a wakeup signal block, and thus leading to failure of receiving a wakeup signal block or failure of parsing the wakeup signal block accurately due to weak signal strength of the received wakeup signal block. Therefore, by indicating to the UE the beam for receiving the wakeup signal block, the UE can receive the wakeup signal over the indicated beam and it is ensured that the UE receives the wakeup signal block well.

Optionally, if the UE is in an idle state, the indication information may be system information.

In an example, for UE in an idle state, since the UE has not yet established a communication connection with the base station, the indication information can be sent to the UE through system information. It should be noted that a system information block containing the indication information is different from existing system information block and it can be numbered after the existing system information block. In addition, the system information used to carry the indication information may belong to other system information (OSI).

Optionally, the system information is sent to the UE by broadcasting.

Optionally, the system information is sent to the UE on demand.

In an example, the base station may send the system information carrying the indication information to the UE by broadcasting. Alternatively, the base station may send the system information carrying the indication information to the UE on demand. The manner by which the base station sends the system information to the UE can be configured as needed.

The on demand means that the system information is sent to the UE only when a request for the system information is received from the UE.

Optionally, the indication information indicates the beam for receiving the wakeup signal block by the UE through an index of a synchronization signal block (SSB for short) (also referred to as SSB index).

In an example, for UE in an idle state, the SSB index can be used to indicate the beam for receiving the wakeup signal block by the UE.

Optionally, if the UE is in a connected state, the indication information may be a radio resource control (RRC for short) message.

In an example, for UE in a connected state, since the UE has established a communication connection with the base station, the RRC information can be sent directly to the UE by the base station and a wakeup signal block can be carried by the RRC information for the UE to receive.

Optionally, the indication information indicates the beam for receiving the wakeup signal block by the UE through the SSB and/or a channel state information reference signal (CSI-RS).

In an example, there is a correspondence between the SSB index and the beam, and a correspondence between the CRI-RS and the beam.

Generally, since UE in an idle state has not yet established a communication connection with the base station, the assistance indication information for indicating beams which is possibly received by the UE can only include the SSB index. Thus, the assistance indication information sent to UE in an idle state may include the SSB index.

Since UE in a connected state has established a communication connection with the base station, the assistance indication information for indicating beams which is possibly received by the UE may be the SSB index or the CSI-RS. Therefore, the assistance indication information sent to UE in a connected state may include the SSB index and/or the CSI-RS. Whether the assistance indication information includes the SSB index or the CSI-RS or both the SSB index and the CSI-RS may be depending on actual configuration.

Optionally, the indication information is further used to indicate a structure of the wakeup signal block.

Optionally, the structure of the wakeup signal block includes one of the following.

A wakeup signal, a physical channel, and a wakeup signal and a physical channel.

In an example, structures of different wakeup signal blocks can be different. For example, the structure of the wakeup signal block can include only the wakeup signal, or only the physical channel, or both the wakeup signal and the physical channel. By indicating the structure of the wakeup signal block through the indication information, it enables the UE to receive the wakeup signal block by using corresponding receiving methods for different structures. For example, for the case that the structure of the wakeup signal block includes only the wakeup signal, if the base station sends the wakeup signal block by broadcasting, the UE only needs to monitor what a base station broadcasts. For the case that the structure of the wakeup signal block includes only the physical channel, the UE only needs to monitor the physical channel. Accordingly, it is ensured that the UE can receive the contents of the wakeup signal block well.

In an example, the physical channel may be used to transmit assistance information. The assistance information is used to assist the UE in receiving or sending a signal. By configuring a physical channel in a wakeup signal block, the wakeup signal block can carry the wakeup signal to wake up the UE and at the same time carry assistance information over the physical channel. In this way, more information can be sent to the UE when the wakeup signal is sent to the UE. Thus, more service requirements can be satisfied.

The assistance information may include assistance demodulation information. The assistance demodulation information is used to demodulate information transmitted over the PDCCH. The assistance information may further include assistance grouping information. The UE uses the assistance grouping information to determine whether a UE group to which the UE belongs corresponds to a UE group indicated by the assistance grouping information. The assistance information may further include the above indication information.

In addition, the wakeup signal may further include the assistance grouping information. In this case, the wakeup signal may be an orthogonal pseudo-random sequence. The wakeup signal and the physical channel may be frequency-division-multiplexed or time-division-multiplexed.

Optionally, the indication information is further used to indicate a state of a beam when the UE is receiving the wakeup signal block.

In an example, in general, the state of the beam is fixed, but in some cases, the base station may change the state of the beam.

For example, in an original state, the base station configures 8 beams within 360° around itself, each with an angle of 45°. The base station can send a wakeup signal block including a physical channel to the UE. The physical channel carries indication information for indicating beams corresponding to signal receiving and signal sending of the UE respectively. Take UE in an idle state as an example, the indication information can include an SSB index. If the indication information received by the UE includes SSB1, a corresponding beam is beam 1 in the range of 0° to 45°. In this state, if the UE receives SSB1, it is determined that the signal is received over beam 1. If an SSB index other than SSB1 is received, for example, SSB2 corresponding to beam 2 in the range of 45° to 90°, it is determined that no signal is received over beam 1 and the signal over beam 2 is not received.

If the state of the beam is changed, for example, in a new state, the base station configures 4 beams within 360° around itself, each with an angle of 90°. Since the number of beams is reduced in the new state, respective angle ranges of the beams are expanded, resulting in SSB1 and SSB2 corresponding to a same beam, i.e., corresponding to beam 1' in the range of 0° to 90°. In this state, whether the UE receives SSB1 or SSB2, the signal is received over beam 1'. If the UE does not receive the signal over beam 1' because it receives SSB2, it may result in the UE not receiving the signal, or there is a delay in receiving the signal.

By indicating a state of a beam when UE is receiving a wakeup signal block, it is possible to enable the UE to determine the state of the beam, and thus to determine a relationship between an angle corresponding to a beam in a new state and an angle corresponding to a beam in an original state, based on the beam in the original state. In this way, it is possible to receive a signal over a beam indicated by indication information when more indication information for indicating the beam for receiving the wakeup signal block by the UE.

For example, after determining the angular expansion of the beam, the UE can determine new indication information that a beam corresponding to an original indication information belongs to a same expanded beam. And then when the new indication information and the original indication information are received, a signal can be received over the beam corresponding to the indication information. For example, based on the above example, the UE can determine that SSB1 and SSB2 correspond to a same beam. When the UE receives SSB2, a signal can be received over a beam corresponding to SSB2.

Figure 2:
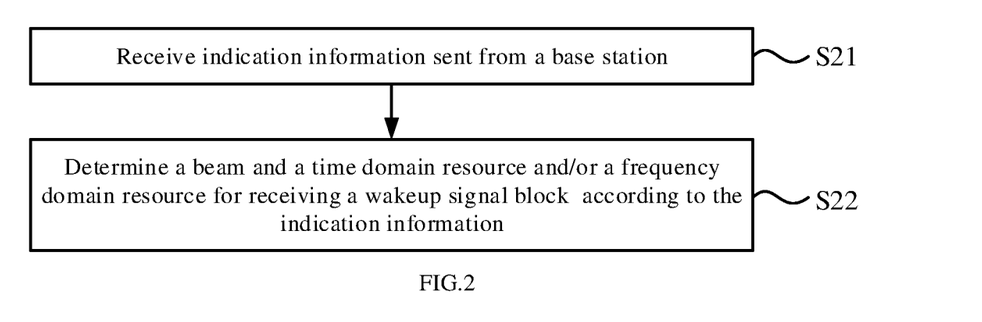
FIG. 2 is a flowchart of another wakeup method according to an example of the present disclosure.

FIG. 2 is a flowchart of another wakeup method according to an example of the present disclosure. The wakeup method in this example may be applied to UE. The UE may communicate with a base station, for example, based on NR or LTE. The UE may be an electronic device such as a mobile phone, a tablet computer, and a wearable device.

As shown in FIG. 2, the wakeup method may include the following steps.

At step S21, indication information sent from a base station is received.

At step S22, a beam and a time domain resource and/or a frequency domain resource for receiving a wakeup signal block are determined according to the indication information.

Optionally, if the UE is in an idle state, the indication information is system information.

Figure 3:
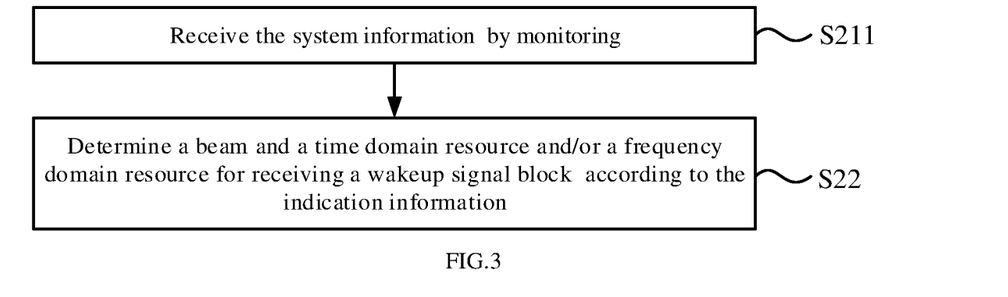
FIG. 3 is a flowchart of another wakeup method according to an example of the present disclosure.

FIG. 3 is a flowchart of another wakeup method according to an example of the present disclosure. As shown in FIG. 3, on the basis of the example of FIG. 2, receiving the indication information sent from the base station includes the following step.

At step S211, the system information is received by monitoring.

Figure 4:
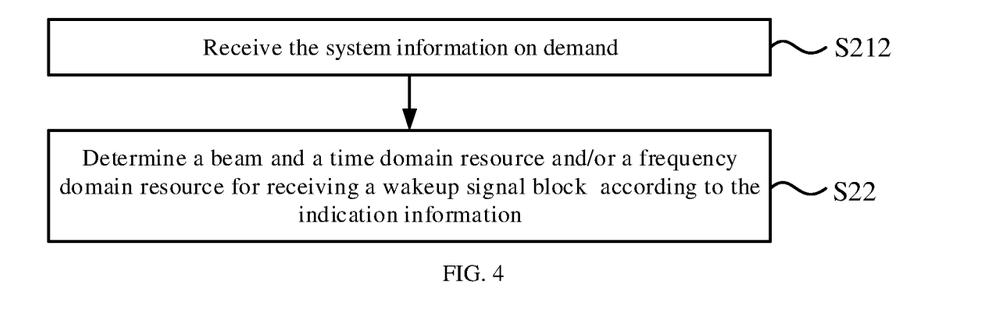
FIG. 4 is a flowchart of another wakeup method according to an example of the present disclosure.

FIG. 4 is a flowchart of another wakeup method according to an example of the present disclosure. As shown in FIG. 4, On the basis of the example of FIG. 2, receiving the indication information sent from the base station includes the following step.

At step S212, the system information is received on demand.

Optionally, the indication information indicates the beam for receiving the wakeup signal block by the UE through an index of a synchronization signal block.

Optionally, if the UE is in a connected state, the indication information is a radio resource control message.

Optionally, the indication information indicates the beam for receiving the wakeup signal block by the UE through an index of a synchronization signal block; and/or a channel state information reference signal.

Figure 5:
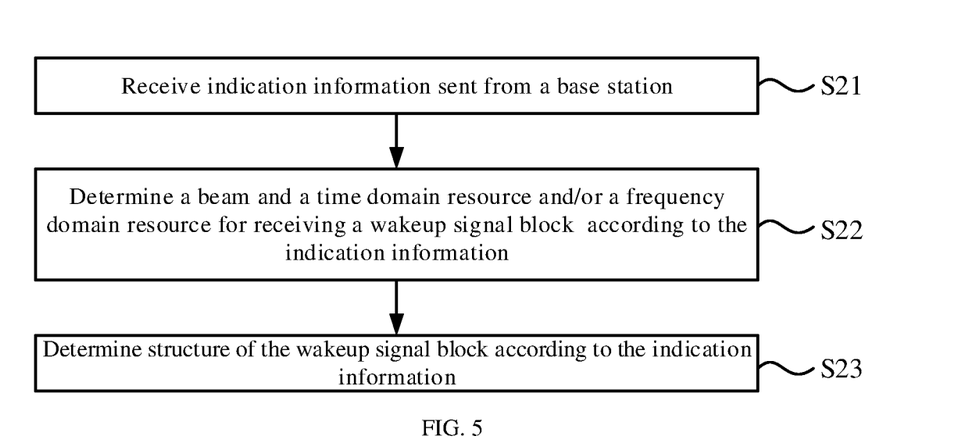
FIG. 5 is a flowchart of another wakeup method according to an example of the present disclosure.

FIG. 5 is a flowchart of another wakeup method according to an example of the present disclosure. As shown in FIG. 5, On the basis of the example of FIG. 2, the wakeup method may further include the following step.

At step S23, a structure of the wakeup signal block is determined according to the indication information.

Optionally, the structure of the wakeup signal block includes one of:

a wakeup signal, a physical channel, and a wakeup signal and a physical channel.

Figure 6:
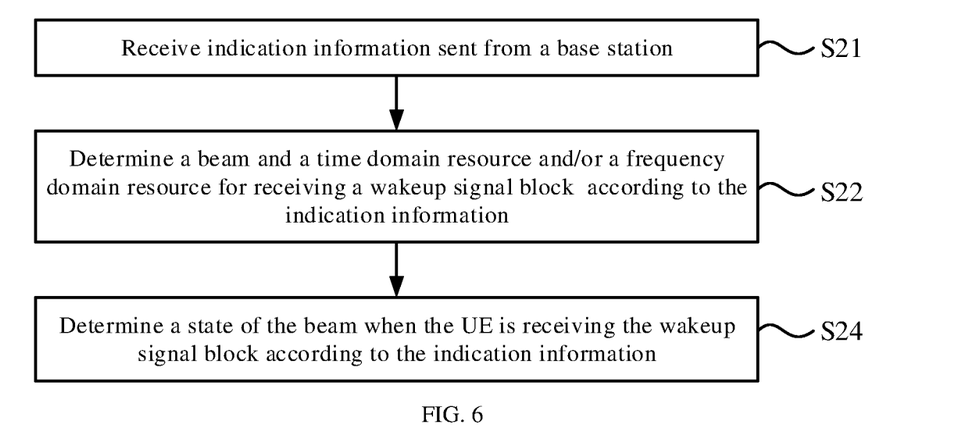
FIG. 6 is a flowchart of another wakeup method according to an example of the present disclosure.

FIG. 6 is a flowchart of another wakeup method according to an example of the present disclosure. As shown in FIG. 6, On the basis of the example of FIG. 2, the wakeup method may further include the following step.

At step S24, a state of the beam when the UE is receiving the wakeup signal block is determined according to the indication information.

Corresponding to the wakeup method of the above examples, the present disclosure further provides an example of a wakeup apparatus.

Figure 7:
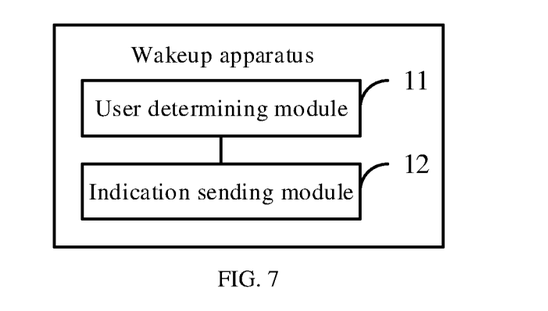
FIG. 7 is a schematic block diagram of a wakeup apparatus according to an example of the present disclosure.

FIG. 7 is a schematic block diagram of a wakeup apparatus according to an example of the present disclosure. The wakeup apparatus in this example may be applied to a base station. The base station may communicate with UE, for example, based on NR or LTE. The UE may be an electronic device such as a mobile phone, a tablet computer and a wearable device.

As shown in FIG. 7, the wakeup apparatus may include:

a user determining module 11, configured to determine UE to be waked up;

an indication sending module 12, configured to send indication information to the UE, wherein the indication information is used to indicate a beam and a time domain resource and/or a frequency domain resource for receiving a wakeup signal block by the UE.

Optionally, if the UE is in an idle state, the indication information is system information.

Optionally, the system information is sent to the UE by broadcasting.

Optionally, the system information is sent to the UE on demand.

Optionally, the indication information indicates the beam for receiving the wakeup signal block by the UE through an index of a synchronization signal block.

Optionally, if the UE is in a connected state, the indication information is a radio resource control message.

Optionally, the indication information indicates the beam for receiving the wakeup signal block by the UE through an index of a synchronization signal block and/or a channel state information reference signal.

Optionally, the indication information is further used to indicate a structure of the wakeup signal block.

Optionally, the structure of the wakeup signal block includes one of:

a wakeup signal, a physical channel, and a wakeup signal and a physical channel.

Optionally, the indication information is further used to indicate a state of the beam when the UE is receiving the wakeup signal block.

Figure 8:
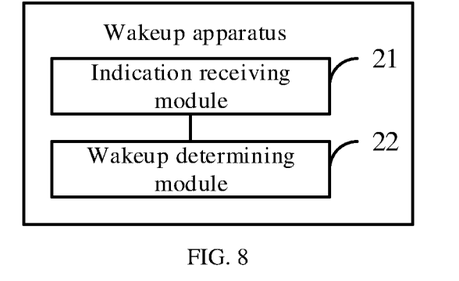
FIG. 8 is a schematic block diagram of another wakeup apparatus according to an example of the present disclosure.

FIG. 8 is a schematic block diagram of another wakeup apparatus according to an example of the present disclosure. The wakeup apparatus in this example may be applied to UE. The UE may communicate with a base station, for example, based on NR or LTE. The UE may be an electronic device such as a mobile phone, a tablet computer and a wearable device.

As shown in FIG. 8, the wakeup apparatus may include:

an indication receiving module 21, configured to receive indication information sent from a base station;

a wakeup determining module 22, configured to determine a beam and a time domain resource and/or a frequency domain resource for receiving a wakeup signal block according to the indication information.

Optionally, if the UE is in an idle state, the indication information is system information.

Optionally, the indication receiving module is configured to receive the system information by monitoring.

Optionally, the indication receiving module is configured to receive the system information on demand.

Optionally, the indication information indicates the beam for the UE to receive the wakeup signal block through an index of a synchronization signal block.

Optionally, if the UE is in a connected state, the indication information is a radio resource control message.

Optionally, the indication information indicates the beam for the UE to receive the wakeup signal block through an index of a synchronization signal block and/or a channel state information reference signal.

Figure 9:
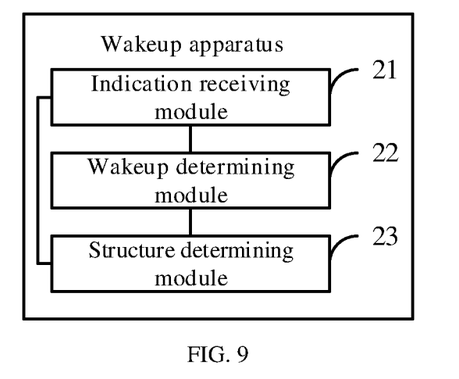
FIG. 9 is a flowchart of another wakeup method according to an example of the present disclosure.

FIG. 9 is a schematic block diagram of another wakeup apparatus according to an example of the present disclosure. As shown in FIG. 9, on the basis of the example of FIG. 8, the wakeup apparatus further includes:

a structure determining module 23, configured to determine a structure of the wakeup signal block according to the indication information.

Optionally, the structure of the wakeup signal block includes one of:

a wakeup signal, a physical channel, and a wakeup signal and a physical channel.

Figure 10:
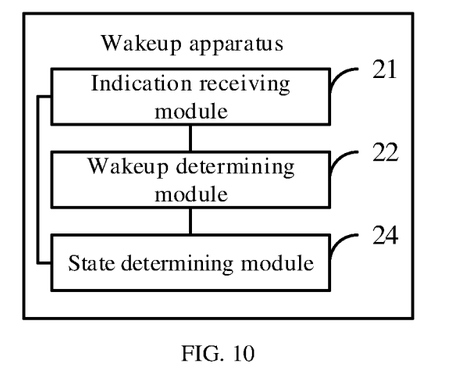
FIG. 10 is a flowchart of another wakeup method according to an example of the present disclosure.

FIG. 10 is a schematic block diagram of another wakeup apparatus according to an example of the present disclosure. As shown in FIG. 10, on the basis of the example of FIG. 8, the wakeup apparatus further includes:

a state determining module 24, configured to determine a state of the beam when the UE is receiving the wakeup signal block according to the indication information.

The specific manner of performing operation by each module in the apparatus in the above examples is already detailed in the examples of the relevant method and will not be repeated herein.

Since the apparatus embodiments substantially correspond to the method embodiments, a reference may be made to part of the descriptions of the method embodiments for the related part. The apparatus embodiments described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

The example of the present disclosure further provides an electronic device, including:

a processor; and a memory storing instructions executable by the processor.

The processor is configured to perform the steps in the method according to any one above example.

An example of the present disclosure provides a computer readable storage medium storing computer programs thereon, where the programs are executed by the processor to perform the steps in the method according to any one above example.

Figure 11:
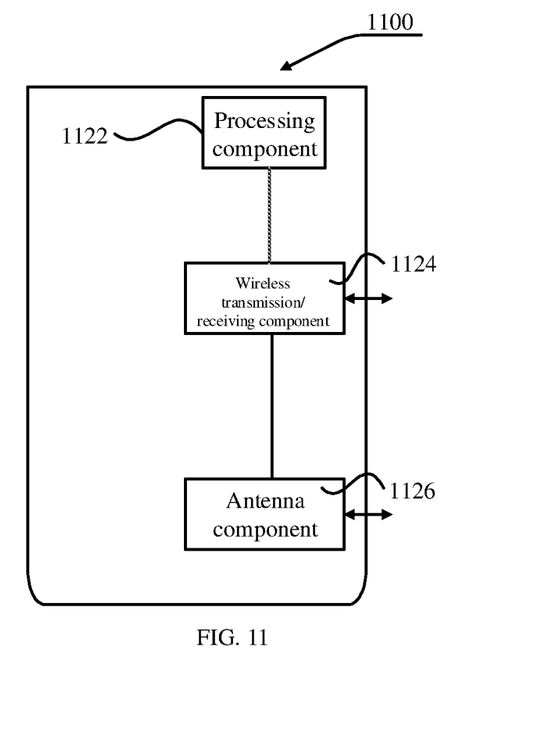
FIG. 11 is a structural schematic diagram of an apparatus for wakeup according to an example of the present disclosure.

FIG. 11 is a structural schematic diagram of an apparatus 1100 for wakeup according to an example of the present disclosure. The apparatus 1100 may be provided as a base station. As shown in FIG. 11, the apparatus 1100 includes a processing component 1122, a wireless transmission/receiving component 1124, an antenna component 1126, and a signal processing part specific to a wireless interface. The processing component 1122 may further include one or more processors. One processor in the processing component 1122 may be configured to perform the steps in the method according to any one above example.

Figure 12:
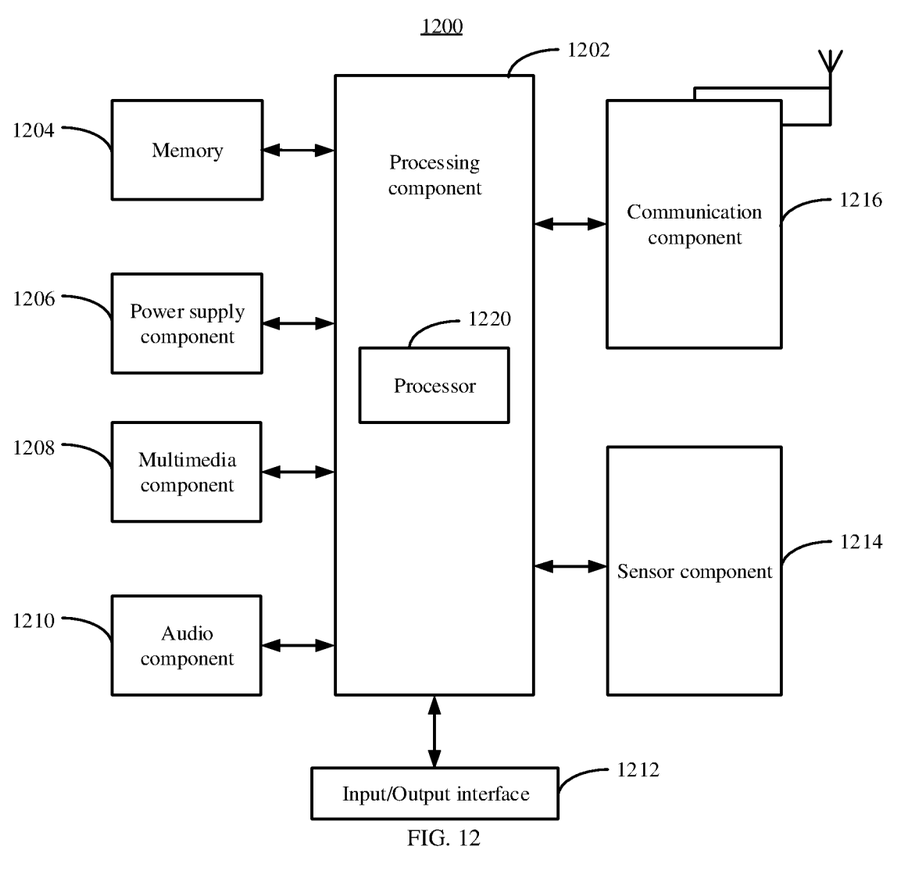
FIG. 12 is a structural schematic diagram of another apparatus for wakeup according to an example of the present disclosure.

FIG. 12 is a structural schematic diagram of another apparatus 1200 for wakeup according to an example of the present disclosure. For example, the apparatus 1200 may be a mobile phone, a computer, digital broadcast terminal, a message transceiver, a game console, a tablet device, a medical device, a fitness device and a personal digital assistant and so on.

As shown in FIG. 12, the apparatus 1200 may include one or more of a processing component 1202, a memory 1204, a power supply component 1206, a multimedia component 1208, an audio component 1210, an input/output interface 1212, a sensor component 1214 and a communication component 1216.

The processing component 1202 generally controls overall operations of the apparatus 1200, such as operations associated with display, phone calls, data communications, camera operations, and recording operations. The processing component 1202 may include one or more processors 1220 to execute instructions to complete all or part of the steps of the above methods. In addition, the processing component 1202 may include one or more modules which facilitate the interaction between the processing component 1202 and other components. For example, the processing component 1202 may include a multimedia module to facilitate the interaction between the multimedia component 1208 and the processing component 1202.

The memory 1204 is configured to store various types of data to support the operation of the apparatus 1200. Examples of such data include instructions for any application or method operated on the apparatus 1200, contact data, phonebook data, messages, pictures, videos, and so on. The memory 1204 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1206 supplies power for different components of the apparatus 1200. The power supply component 1206 may include a power supply management system, one or more power supplies, and other components associated with generating, managing and distributing power for the apparatus 1200.

The multimedia component 1208 includes a screen providing an output interface between the apparatus 1200 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1208 may include a front camera and/or a rear camera. The front camera and/or rear camera may receive external multimedia data when the apparatus 1200 is in an operating mode, such as a photographing mode or a video mode. Each of the front camera and the rear camera may be a fixed optical lens system or have focal length and optical zooming capability.

The audio component 1210 is configured to output and/or input an audio signal. For example, the audio component 1210 includes a microphone (MIC). When the apparatus 1200 is in an operating mode, such as a call mode, a record mode and a voice recognition mode, the microphone is configured to receive an external audio signal. The received audio signal may be further stored in the memory 1204 or sent via the communication component 1216. In some examples, the audio component 1210 further includes a speaker for outputting an audio signal.

The I/O interface 1212 provides an interface between the processing component 1202 and a peripheral interface module. The above peripheral interface module may be a keyboard, a click wheel, buttons, or the like. These buttons may include but not limited to, a home button, a volume button, a start button and a lock button.

The sensor component 1214 includes one or more sensors to provide status assessments of various aspects for the apparatus 1200. For example, the sensor component 1214 may detect the on/off status of the apparatus 1200, and relative positioning of component, for example, the component is a display and a keypad of the apparatus 1200. The sensor component 1214 may also detect a change in position of the apparatus 1200 or a component of the apparatus 1200, a presence or absence of the contact between a user and the apparatus 1200, an orientation or an acceleration/deceleration of the apparatus 1200, and a change in temperature of the apparatus 1200. The sensor component 1214 may include a proximity sensor to detect the presence of a nearby object without any physical contact. The sensor component 1214 may further include an optical sensor, such as a Complementary Metal-Oxide-Semiconductor (CMOS) or Charged Coupled Device (CCD) image sensor which is used in imaging applications. In some examples, the sensor component 1214 may further include an acceleration sensor, a gyroscope sensor, a magnetic sensor, a pressure sensor, or a temperature sensor.

The communication component 1216 is configured to facilitate wired or wireless communication between the apparatus 1200 and other devices. The apparatus 1200 may access a wireless network based on a communication standard, such as Wi-Fi, 2G or 3G, or a combination thereof. In an example, the communication component 1216 receives a broadcast signal or broadcast related information from an external broadcast management system via a broadcast channel. In an example, the communication component 1216 may further include a Near Field Communication (NFC) module for promoting short-range communication. For example, the NFC module may be implemented based on a radio frequency identification (RFID) technology, an infrared data association (IrDA) technology, an ultra-wideband (UWB) technology, a Bluetooth® (BT) technology and other technologies.

In an example, the apparatus 1200 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above wakeup methods.

In an example, there is further provided a non-transitory computer readable storage medium including instructions, such as the memory 1204 including instructions. The above instructions may be executed by the processor 1220 of the apparatus 1200 to complete the above method. For example, the non-transitory computer readable storage medium may be a Read-Only Memory (ROM), a Random Access Memory (RAM), a CD-ROM, a magnetic tape, a floppy disk, an optical data storage device, and so on.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of a method and an apparatus provided according to the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A wakeup method applied to a base station, comprising:
   determining user equipment to be waked up, wherein the user equipment is in one of an idle state or a connected state; and
   sending indication information to the user equipment, wherein the indication information is configured to indicate a beam and at least one of a time domain resource or a frequency domain resource, for receiving a wakeup signal block by the user equipment,
   wherein the indication information is one of system information for the user equipment in the idle state or a radio resource control message for the user equipment in the connected state;
   when the indication information is the system information for the user equipment in the idle state, the indication information indicates the beam for receiving the wakeup signal block by the user equipment through an index of a synchronization signal block; and
   when the indication information is the radio resource control message for the user equipment in the connected state, the indication information indicates the beam for receiving the wakeup signal block by the user equipment through at least one of:
   an index of a synchronization signal block; or
   a channel state information reference signal.

2. The wakeup method according to claim 1, wherein the indication information is the system information for the user equipment in the idle state, and the system information is sent to the user equipment by broadcasting or on demand.

3. The wakeup method according to claim 1, wherein the indication information is further configured to indicate a structure of the wakeup signal block.

4. The wakeup method according to claim 3, wherein the structure of the wakeup signal block comprises one of:
   a wakeup signal;
   a physical channel; and
   a wakeup signal and a physical channel.

5. The wakeup method according to claim 1, wherein the indication information is further configured to indicate a state of the beam when the user equipment is receiving the wakeup signal block.

6. A wakeup method applied to user equipment, comprising:
   receiving indication information sent from a base station, wherein the user equipment is in one of an idle state or a connected state; and
   determining a beam and at least one of a time domain resource or a frequency domain resource, for receiving a wakeup signal block according to the indication information,
   wherein the indication information is one of system information for the user equipment in the idle state or a radio resource control message for the user equipment in the connected state;
   when the indication information is the system information for the user equipment in the idle state, the indication information indicates the beam for receiving the wakeup signal block by the user equipment through an index of a synchronization signal block; and
   when the indication information is the radio resource control message for the user equipment in the connected state, the indication information indicates the beam for receiving the wakeup signal block by the user equipment through at least one of:
an index of a synchronization signal block; or
a channel state information reference signal.

7. The wakeup method according to claim 6, wherein the user equipment is in the idle state, and receiving the indication information sent from the base station comprises:
receiving the system information by monitoring or on demand.

8. The wakeup method according to claim 6, further comprising:
determining a structure of the wakeup signal block according to the indication information.

9. The wakeup method according to claim 8, wherein the structure of the wakeup signal block comprises one of:
a wakeup signal;
a physical channel; and
a wakeup signal and a physical channel.

10. The wakeup method according to claim 6, further comprising:
determining a state of the beam when the user equipment is receiving the wakeup signal block according to the indication information.

11. A base station, comprising:
a processor; and
a memory storing instructions executable by the processor,
wherein the processor is configured to perform the method according to claim 1.

12. An electronic device, comprising:
a processor; and
a memory storing instructions executable by the processor,
wherein the processor is configured to:
receive indication information sent from a base station, wherein the electronic device is in an idle state or a connected state; and
determine a beam and at least one of a time domain resource or a frequency domain resource, for receiving a wakeup signal block according to the indication information,
wherein the indication information is one of system information for the electronic device in the idle state or a radio resource control message for the electronic device in the connected state;
when the indication information is the system information for the user equipment in the idle state, the indication information indicates the beam for receiving the wakeup signal block by the user equipment through an index of a synchronization signal block; and
when the indication information is the radio resource control message for the user equipment in the connected state, the indication information indicates the beam for receiving the wakeup signal block by the user equipment through at least one of:
an index of a synchronization signal block; or
a channel state information reference signal.

* * * * *